United States Patent [19]

Couvez

[11] Patent Number: 4,690,254
[45] Date of Patent: Sep. 1, 1987

[54] PAD SPRING FOR A DISC BRAKE WITH A SLIDING CALIPER, AND DISC BRAKE EQUIPPED WITH SUCH A SPRING

[75] Inventor: Marc Couvez, Aubervilliers, France

[73] Assignee: Societe Anonyme D.B.A., Paris, France

[21] Appl. No.: 874,880

[22] Filed: Jun. 16, 1986

Related U.S. Application Data

[63] Continuation of Ser. No. 755,955, Jul. 16, 1985, abandoned, which is a continuation of Ser. No. 525,202, Aug. 22, 1983, abandoned.

[30] Foreign Application Priority Data

Sep. 30, 1982 [FR] France ............................ 82 16450

[51] Int. Cl.⁴ .............................................. F16D 65/02
[52] U.S. Cl. .............................. 188/73.36; 188/73.38; 192/30 J
[58] Field of Search ............... 188/73.38, 73.36, 73.35; 192/30 J

[56] References Cited

U.S. PATENT DOCUMENTS

| 3,337,009 | 8/1967 | Meier | 188/72.5 X |
| 3,880,261 | 4/1975 | Courbot | 188/205 A |
| 4,360,079 | 11/1982 | Belart | 188/73.36 X |
| 4,422,534 | 12/1983 | Oshima | 188/73.38 |
| 4,428,463 | 1/1984 | Burgdorf et al. | 188/73.38 |
| 4,441,588 | 4/1984 | Saito | 188/73.38 |
| 4,463,837 | 8/1984 | Courbot | 188/73.38 |

FOREIGN PATENT DOCUMENTS

| 1189333 | 3/1965 | Fed. Rep. of Germany | 188/73.38 |
| 2252156 | 5/1974 | Fed. Rep. of Germany | 188/73.38 |
| 2314700 | 10/1974 | Fed. Rep. of Germany | 188/73.38 |
| 2345733 | 3/1975 | Fed. Rep. of Germany | |
| 2514383 | 11/1975 | Fed. Rep. of Germany | |
| 2318347 | 2/1977 | France | |

Primary Examiner—George E. A. Halvosa
Attorney, Agent, or Firm—Larry J. Palguta; Ken C. Decker

[57] ABSTRACT

The spring comprises a lateral mounting portion (21) in the shape of a U whose branches (22, 23) are elastically engaged with a transverse bulkhead portion (15) defined between two lateral spaces (13, 14) extending from the central opening (12) of the caliper arch (6), the upper branch (23) of the U being extended by folding into a bearing portion (24) overhanging in the opening (12) and defining a line of bearing contact (26) on a protuberance (30) of the pads (10) parallel to the disc axis. The spring (20) is made from spring steel sheet.

4 Claims, 4 Drawing Figures

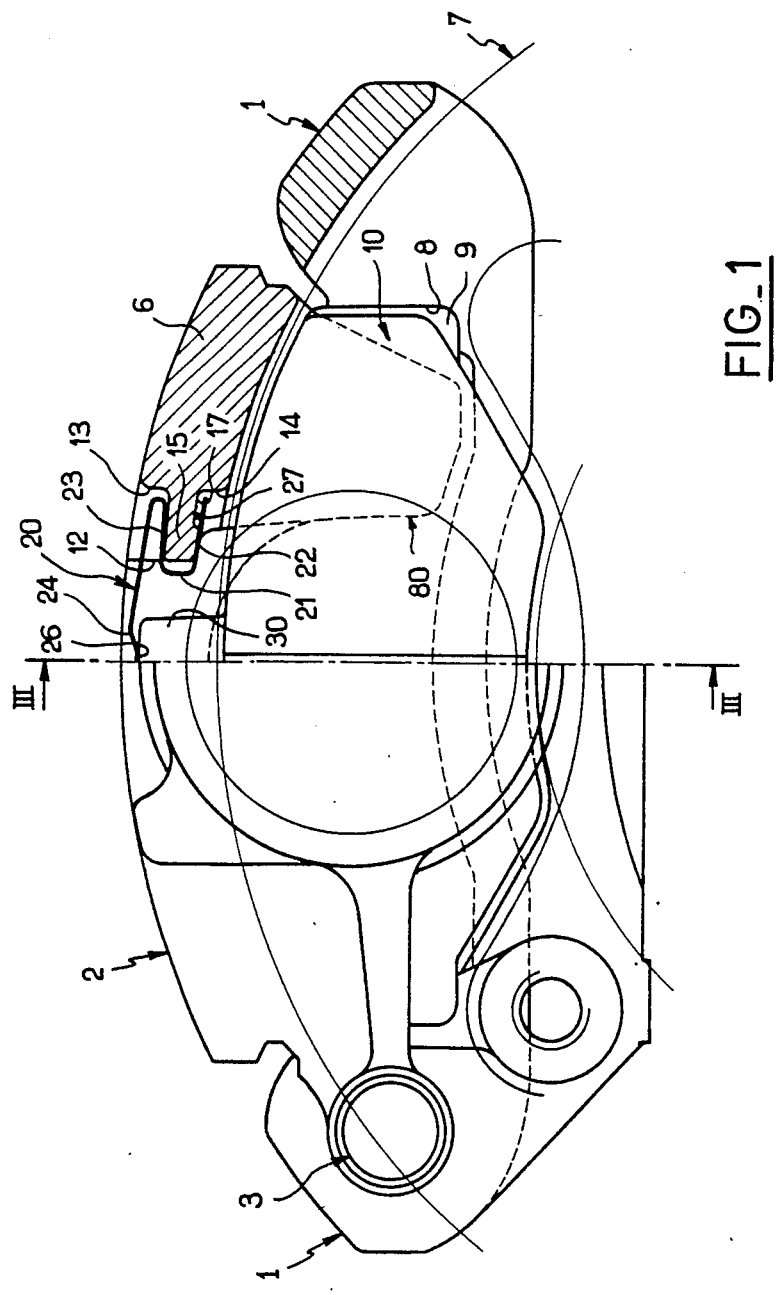
FIG_1

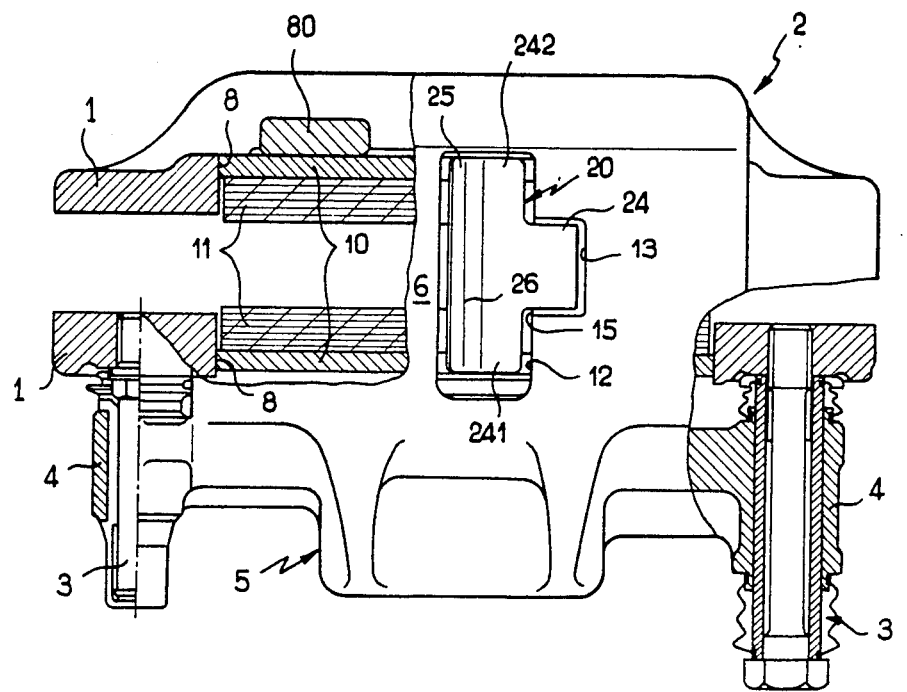
FIG_2

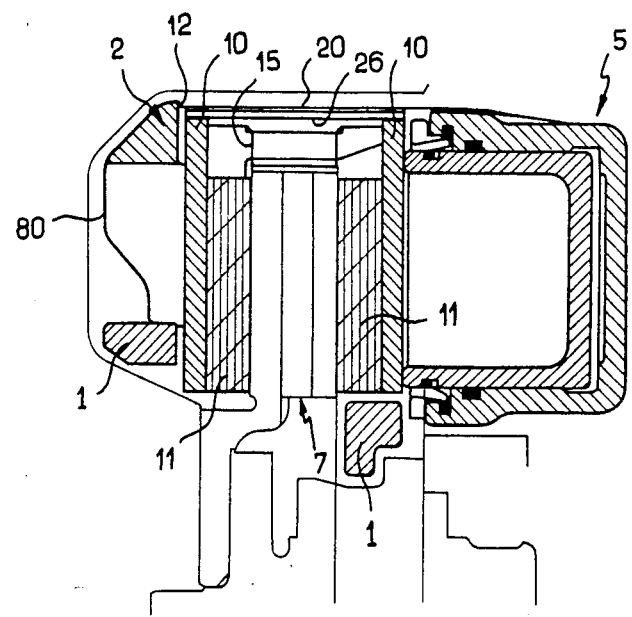
FIG_3
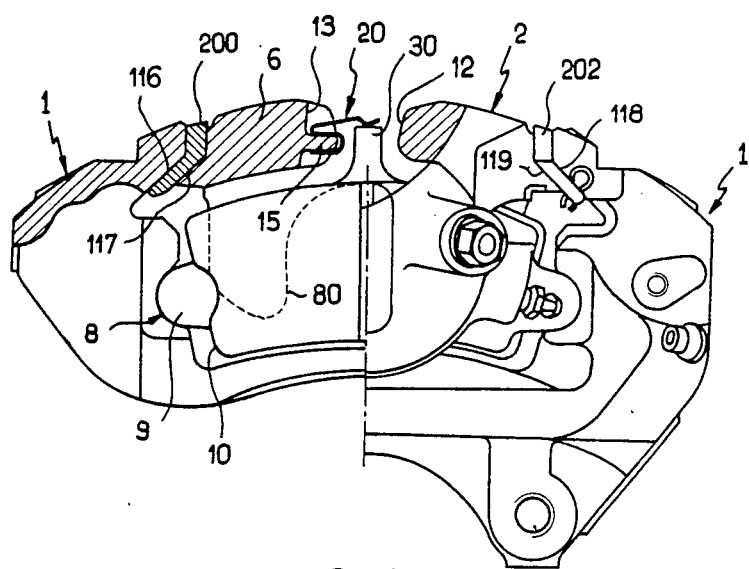
FIG_4

4,690,254

PAD SPRING FOR A DISC BRAKE WITH A SLIDING CALIPER, AND DISC BRAKE EQUIPPED WITH SUCH A SPRING

This is a continuation of abandoned application Ser. No. 755,955 filed July 16, 1985 which is a continuation of abandoned application Ser. No. 525,202 filed Aug. 22, 1983.

The present invention concerns disc brake pad springs, and more particularly, a pad spring for a disc brake of the type incorporating a caliper slidably mounted on a fixed support by means of at least two cooperating axial slide surfaces on the caliper and on the fixed support, respectively, and two friction pads anchored and able to slide in an opening in the fixed support, the caliper incorporating a portion in the form of an arch having directly above the friction pads, a through opening for elastically mounting the spring in this opening, the spring being provided with a bearing portion intended to bear against a protuberance of each pad projecting radially at least partially into the opening.

A disc brake provided with such a pad spring is described in French patent application No. 2,423,680. However, in said document, the spring is mounted elastically in the inner portion of the caliper arch by means of symmetrical feet entering spaces in the inner face of the caliper, the spring being positioned in the opening by radial feet, the spring assembly being positioned in the immediate region of the periphery of the disc and thus subjected to severe operational temperature conditions.

An object of the present invention is to propose a pad spring for a brake of the type mentioned above, of simple construction, of low manufacturing cost and positioned radially at a distance from the interface between the inner face of the calliper arch and the periphery of the disc.

To achieve this object, according to a feature of the present invention, the spring incorporates a lateral mounting portion intended to be elastically mounted on a lateral zone of reduced thickness of the caliper opening and extending into a bearing portion which extends transversely across the opening.

According to a more particular feature of the invention, the bearing portion of the spring overhangs from the mounting portion and forms a line of contact with the brake pads which is essentially parallel to the disc axis.

Another object of the present invention is to propose a disc brake of the type mentioned above, arranged to be equipped with a pad spring according to the invention.

For this purpose, according to another feature of the invention, the caliper arch incorporates, on one side of the opening, radially opposed recessed spaces defining between them a mounting wall portion forming the lateral zone of reduced thickness for mounting the lateral mounting portion of the spring.

Other feature and advantage of the present invention will emerge from the following description of embodiments, given by way of illustration but not in any way limiting, with reference to the accompanying drawings, in which:

FIG. 1 is an end view, half sectioned, of a first embodiment of a disc brake equipped with a spring according to the invention;

FIG. 2 is a plan view, partially sectioned, of the brake shown in FIG. 1;

FIG. 3 is a section along the line III—III in FIG. 1; and

FIG. 4 is an end view, viewed from the outside, of another embodiment of a brake equipped with a pad spring according to the invention.

In the description which follows and in the drawings, similar or identical components carry the same reference numbers.

In the embodiment shown in FIGS. 1 to 3, the disc brake consists of a fixed support 1 in the form of a fork on which a caliper 2 is supported so as to slide axially by means of at least one axial pin 3 fixed for example, to the fixed support and capable of sliding in an annular portion 4 of the inner portion of the caliper 2 in which is arranged a hydraulic motor 5 for actuating the brake. The caliper 2 incorporates a portion in the form of an arch 6 straddling the disc 7 of the brake and forming, opposite the hydraulic motor 5, a caliper boss 80. The arms of the fork of the fixed support 1 define an opening bounded laterally by axial bearing surfaces 8 in which the lateral ends 9 of the support plates 10 of the friction pads, provided with friction linings 11, positioned either side of the disc 7, below the arch 6 of the caliper 2, are anchored and able to slide. This arch 6 incorporates, directly above the upper middle portion of the pads, a through opening 12 in which a pad spring 20, in accordance with the invention, is mounted, intended to apply to the support plates 10 of the brake pads a radial force holding the support plates 10 properly in contact against the bearing surfaces 8 for anchoring and sliding of the fixed support 1, and serving as an anti-noise spring, both for the pads and for the caliper 2.

In accordance with the invention, a lateral side (parallel to the axis of the disc 7) of the opening 12 incorporates two spaces 13 and 14 recessed laterally and opening into outer and inner faces of the arch 6 respectively, so as to define between them a lateral wall portion 15 of reduced axial length having upper and lower faces substantially parallel to the tangent plane at the periphery of the disc 7 directly above this wall portion.

The pad spring 20 consists of a mounting portion 21 in the shape of a U whose branches 22 and 23 have substantially an identical extension length and the same width slightly less than the width (in the axial direction) of the spaces 13 and 14 of the caliper arch 6. The distance, when relaxed, between the two branches 22 and 23 is less than the thickness (in the radial direction) of the wall portion 15. The intermediate branch 23 extends into a portion folded through approximately 180° and forming a bearing arm 24 whose end portion is enlarged laterally, beyond the base of the U formed by the mounting portion 21, in two wings 241 and 242 having a total width less than the width (in the axial direction) of the opening 12 of the caliper arch 6 so as to bridge the support plates 10 of the pads when the latter are equipped with new linings 11. The end portion 25 of the wings 241 and 242 is shaped to extend initially downwards towards the mounting portion 21, then to rise upwards (as may be seen in FIG. 1) so as to define a lower line of contact 26 intended to come to bear on radical projections 30 of the support plates 10 of the brake pads, the line of contact 26 being essentially coincident with the middle radial plane of the brake in order to exert on the pads a truly radial force.

As may be clearly seen in FIG. 1, the middle projections 30 of the support plates 10 of the brake pads extend considerably upwards into the opening 12 of the caliper arch 6, to a level slightly below the upper tangent plane of the caliper arch 6, radially beyond the wall portion 15.

It will be readily understood that the spring 20, made from spring steel sheet, is placed in position very simply in the opening 12 by elastically engaging with force the mounting portion 21 on the wall portion 15, the overhanging arm 24, reinforced in its elastic effect by the hairpin connecting it to the wing 23, being deflected in bending when the caliper is placed in position on the pads 10, 11. Preferably, the lower space 14 incorporates a relief 17 recessed upwards facilitating the introduction of the lower wing 22 of the mounting portion 21, this wing 22 possibly being provided with a small tab 27 folded towards the inside of the U to ensure that the mounting portion 21 is retained on the wall portion 15 by being admitted into the relief 17 and thus opposing any undesirable detachment of the mounting portion 21 from the bulkhead 15 on which it is elastically engaged.

FIG. 4 shows a variant of an embodiment of the brake according to the invention which differs from the preceding embodiment in that the caliper 2 is mounted so as to slide on the fork of the fixed support 1 by means of complementary shaped axial surfaces 116, 118 and 117-119, formed on the fixed support 1 and on the caliper 2 respectively, with sliding keys 200 and 202 interposed between there the pad spring 20 together with its method of mounting in the arch 6 being identical in all respects with the preceding example.

With reference to FIG. 4 it will be readily understood that the end portion 25 of the spring 20 may be extended so that the lateral side positioned on the right of the opening 12 forms an abutment for the spring 20 and prevents its accidental escape. Such an abutment may obviously also be provided on the brake shown in FIG. 1.

Although the present invention has been described relative to particular embodiments, it is not limited by them but, on the contrary, is capable of modifications and variants which will be apparent to a person versed in the art.

I claim:

1. A disc brake of the type incorporating a caliper housing a brake motor, said caliper slidingly supported on a fixed support via at least two axial slide surfaces on the caliper and on the fixed support, two friction pads anchored and able to slide in an opening of the fixed support for selective friction engagement with a disc rotating around an axis, each pad having an upper edge with a substantially central radially outwardly extending protuberance, the caliper having an intermediate portion in the form of an arch straddling the disc and the pads and having, directly above the friction pads, a central opening of reduced circumferential width, relative to the circumferential extent of said arch, limited by facing lateral sides, one of said lateral sides being formed with radially opposed recesses defining therebetween in said arch a lateral web portion of reduced radial thickness, and a pad spring made out of a spring leaf and comprising a cantilevered portion bearing against said protuberance of each pad projecting, in a mounting position in the brake, radially at least partially into said opening, and a lateral mounting portion with integrally formed mounting wings forming a U-shaped channel so that the wings are elastically grippingly mounted on said lateral web portion, the mounting wings having radially spaced-apart planar surfaces which engage corresponding radially spaced-apart surfaces of the lateral web portion, the spring being attached to the caliper at only the lateral web portion of the caliper, one of said wings reversely formed to extend in an opposite direction relative to the U-shaped channel and extend into said cantilevered portion which projects transversely across said opening and forms, adjacent a free end, a line of contact with tops of said protuberances and which is continuous and parallel to said axis of said disc.

2. The disc brake according to claim 1, wherein the lateral web portion has an axial width less than the central opening.

3. The disc brake according to claim 2, wherein the mounting wings are essentially parallel and of the same extended length, the wing radially remote from the axis of the disc extending into the cantilevered portion.

4. The disc brake according to claim 1, wherein the lateral web portion further comprises a radially extending recess having a radial surface disposed adjacent the central opening, and the lateral mounting portion having a tab extending into the channel and radially disposed recess, engagement of the tab with the radial surface preventing detachment of the mounting portion from the web portion.

* * * * *